United States Patent
Urano et al.

(10) Patent No.: US 8,986,874 B2
(45) Date of Patent: Mar. 24, 2015

(54) PRISMATIC CELL AND PRODUCTION METHOD FOR THE SAME

(75) Inventors: Kazuaki Urano, Hitachinaka (JP); Fujio Hirano, Hiratsuka (JP); Kouichi Kajiwara, Hitachinaka (JP); Kiyoyuki Sekine, Yuki (JP); Yasuhiro Matsuoka, Hitachinaka (JP); Suguru Watashi, Mito (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 340 days.

(21) Appl. No.: 13/028,427

(22) Filed: Feb. 16, 2011

(65) Prior Publication Data

US 2011/0223454 A1    Sep. 15, 2011

(30) Foreign Application Priority Data

Mar. 15, 2010  (JP) ................ 2010-057235

(51) Int. Cl.
 *H01M 2/02* (2006.01)
 *H01M 2/04* (2006.01)
 *H01M 2/06* (2006.01)
 (Continued)

(52) U.S. Cl.
 CPC ............ *H01M 2/263* (2013.01); *H01M 2/0473* (2013.01); *H01M 2/305* (2013.01); *H01M 10/0431* (2013.01); *H01M 10/0525* (2013.01);
 (Continued)

(58) Field of Classification Search
 USPC ................... 429/94, 161, 163, 178, 179, 211; 29/623.1
 See application file for complete search history.

(56) References Cited

U.S. PATENT DOCUMENTS

2005/0287429 A1    12/2005  Cho et al.
2006/0051664 A1*   3/2006   Tasai et al. ................... 429/161
(Continued)

FOREIGN PATENT DOCUMENTS

JP    2003-249423    9/2003
JP    2003-346903    12/2003
(Continued)

OTHER PUBLICATIONS

Harima et al., Machine translation of JP 2005-216825 A, Aug. 2005.*
(Continued)

*Primary Examiner* — Sean P Cullen
(74) *Attorney, Agent, or Firm* — Baker Botts LLP

(57) ABSTRACT

A wound electrode body is fabricated by laminating and winding positive and negative electrode sheets together with a separator therebetween for insulation. On both positive and negative electrode side ends of the wound electrode body, laminates of current-collecting foil layered portions of the electrode sheets are bent or folded f toward the outer peripheral side to be separated into two. The separated laminates and forked connector leaves are overlapped and clamped between an ultrasonic chip and an anvil. Then, they are welded. The forked connector leaves are arranged such that no opposing forked connector leaf is present in the direction of a line normal to the forked connector leaf, so that the anvil does not have to be cantilevered. This allows welding by using the ultrasonic chip and the anvil without interfering with the collector rs. As a result, the quality of welding is improved.

8 Claims, 9 Drawing Sheets

(51) Int. Cl.
*H01M 2/20* (2006.01)
*H01M 2/26* (2006.01)
*H01M 2/30* (2006.01)
*H01M 10/0587* (2010.01)
*H01M 10/04* (2006.01)
*H01M 10/0525* (2010.01)

(52) U.S. Cl.
CPC .......... *H01M 10/0587* (2013.01); *Y02E 60/122* (2013.01)
USPC ............. 429/161; 429/94; 429/163; 429/178; 429/179; 429/211; 29/623.1

(56) References Cited

U.S. PATENT DOCUMENTS

| | | |
|---|---|---|
| 2007/0009793 A1 | 1/2007 | Kim et al. |
| 2011/0195286 A1* | 8/2011 | Aota et al. .................. 429/94 |
| 2011/0195287 A1 | 8/2011 | Kamifuji et al. |

FOREIGN PATENT DOCUMENTS

| | | |
|---|---|---|
| JP | 2005-032477 | 2/2005 |
| JP | 2005-216825 | 8/2005 |
| JP | 2006-012836 | 1/2006 |
| JP | 2006-228551 | 8/2006 |
| JP | 2007-019017 | 1/2007 |
| JP | 2007-335150 | 12/2007 |
| JP | 4061938 | 1/2008 |
| JP | 2011-165515 | 8/2011 |
| WO | WO 2011/111196 A1 | 9/2011 |

OTHER PUBLICATIONS

Tanaka et al., Machine translation of JP 2003-249423 A, Sep. 2003.*
Japanese Office Action for Japanese Patent Application No. 2010-057235, dispatched on Jul. 24, 2012.

* cited by examiner

PRISMATIC CELL AND PRODUCTION METHOD FOR THE SAME

INCORPORATION BY REFERENCE

The disclosure of the following priority application(s) is/are herein incorporated by reference: Japanese Patent Application No. 2010-057235 filed Mar. 15, 2010.

BACKGROUND OF THE INVENTION

1. Field of the Invention

The present invention relates to a prismatic cell and a production method for the same. In particular, it relates to a prismatic cell that has a cross-sectional shape of a rectangle, a rectangle with round corners, or the like and a production method of the same.

2. Description of Related Art

Heretofore, a prismatic cell has been known to be a cell that provides a volumetric capacity higher than that of a cylindrical cell. The conventional prismatic cell includes a prismatic cell box and a wound electrode body accommodated therein. The wound electrode body is made by winding a laminate of a positive electrode and a negative electrode each in the form of a belt as well as separators intervening between the positive and negative electrodes. The prismatic cell box is filled with an electrolyte.

In the prismatic cell, the wound electrode body has a current-collecting foil layered portion protruding on each end in a direction along an axis around which the wound electrode body has been wound, to which current-collecting foil layered portion are connected an electrode terminal and a current-collector member. With this construction, an energizing path is made shorter to decrease connection resistance and increase output. Moreover, such a construction is effective also in making the prismatic cell more compact.

To connect the wound electrode body with the collector members, for example, an electricity-accumulating element has been proposed as disclosed in Japanese Patent No. 4061938.

In the electricity-accumulating element disclosed in Japanese Patent No. 4061938, the positive and negative electrode current-collecting foil layered portions on the both ends of the wound electrode body are connected with the respective collector members in the form of a squarish U-letter by ultrasonic welding. In this case, a cantilever anvil is inserted in a space in the collector member in the form of a squarish U-letter. The current-collecting foil layered portion is sandwiched by a chip arranged on an outer periphery of the current-collecting foil layered portion and the anvil and welded to connect them.

SUMMARY OF THE INVENTION

In the above-mentioned conventional technology, the anvil is cantilevered, so that when the anvil is deformed due to pressure from the chip, there is the possibility that welding failure could occur.

According to a first aspect, the present invention provides a prismatic cell comprising: a wound electrode body that includes a positive electrode sheet having a metal foil on which a positive active material has been applied, a negative electrode sheet having a metal foil on which a negative active material has been applied, and separators intervening between the positive and negative electrode sheets, wherein current-collecting foil portions on which no positive or negative active materials have been applied are provided on both ends of the wound electrode body as positive and negative electrode connection parts, respectively, and the positive electrode sheet, the negative electrode sheet and the separators are wound in a flat or thin shape; a container having a flat shape in cross-section, in which the wound electrode body is accommodated, the container having an opening; a lid that seals the Opening of the container; positive and negative external terminals provided on the lid; a positive electrode current-collecting collector member that electrically connects the positive electrode connection part of the positive electrode sheet to the positive external terminal, the positive electrode current-collecting collector member having forked connector leaves with connection surfaces in contact with front and back surfaces of the positive electrode connection part; and a negative electrode current-collecting collector member that electrically connects the negative electrode connection part of the negative electrode sheet to the negative external terminal, the negative electrode current-collecting collector member having forked connector leaves with connection surfaces in contact with front and back surfaces of the negative electrode connection part, wherein on both ends of the wound electrode body in the direction of winding axis, a laminate of the positive electrode sheet in the positive electrode connection part and a laminate of the negative electrode sheet in the negative electrode connection part are separated into two laminates, respectively, by pushing the innermost periphery part outwardly in the direction of the flat container, respectively, and wherein the connection surfaces of the forked connector leaves of the positive and negative electrode collector members, respectively, are welded to the respective outer peripheral surfaces of the separated laminates.

According to a second aspect, the present invention provides a method for producing a prismatic cell according to the first aspect, which method comprising the steps of: fabricating the lid assembly by connecting the positive and negative external terminals to the positive and negative electrode collector members, respectively; fabricating the wound electrode body by winding the positive electrode sheet, the negative electrode sheet and the separators intervening between the positive and negative electrode sheets into a flat shape in cross-section; integrating the lid assembly with the wound electrode body; separating two laminates by outwardly pressing the laminates of the positive and negative electrode connection parts, where the positive and negative electrode sheets have each no active material applied thereon, on both ends of the wound electrode body in the direction of winding axis; and connecting the two separated laminates to the forked connector leaves of the positive and negative electrode collector members, respectively.

With the prismatic cell and the production method of the same according to the present invention, the quality of the welded parts between the positive and negative electrode connection parts (the positive and negative active materials have been applied on the positive and negative electrode connection parts, respectively) of the wound electrode body with the collector member can be improved.

DESCRIPTION OF PREFERRED EMBODIMENTS

The prismatic cell according to one embodiment of the present invention as applied to a lithium ion secondary battery is explained with reference to the attached drawings.

Figure 1:
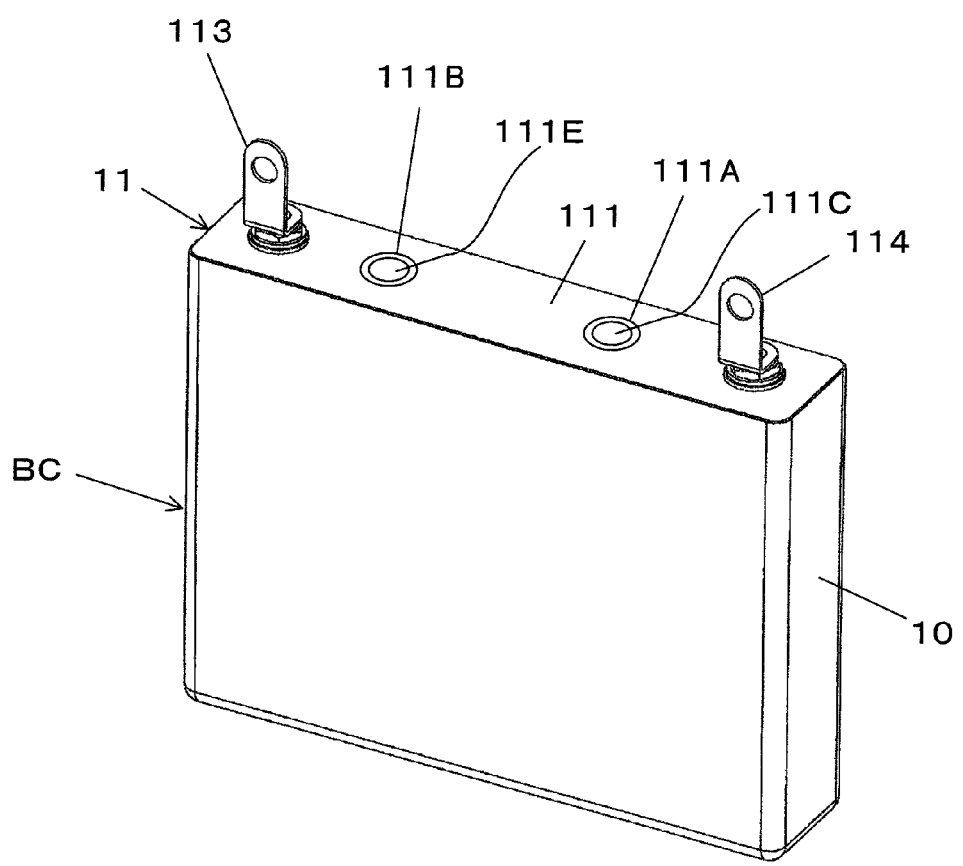
FIG. 1 presents a perspective view showing an appearance of a prismatic cell according to one embodiment of the present invention.
Figure 2:
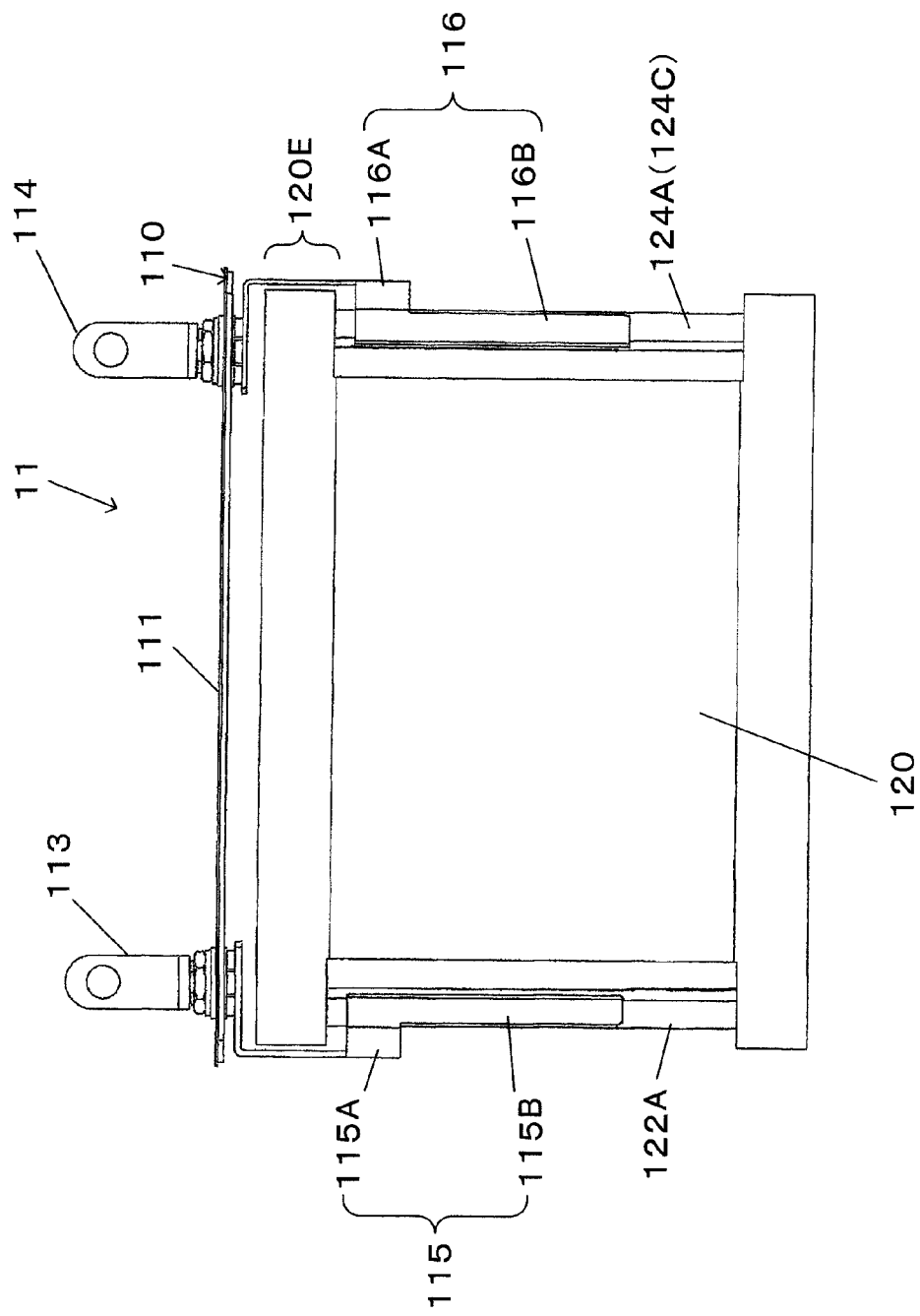
FIG. 2 presents a front view showing the power generating element shown in FIG. 1.

Construction of Prismatic Cell:

A lithium-ion secondary battery BC includes a container 10 having an opening on one end thereof and a power generator element assembly 11 accommodated in the container 10 as shown in FIG. 1. Details of the power generator element assembly 11 is shown in FIG. 2. The container 10 is a closed-end rectangular case in the form of a rectangle, a round-corner rectangle or a round-corner ellipse, which is flat in cross-section. The container 10 therefore is formed with a bottom surface and wider sides and narrower sides.

Figure 3:
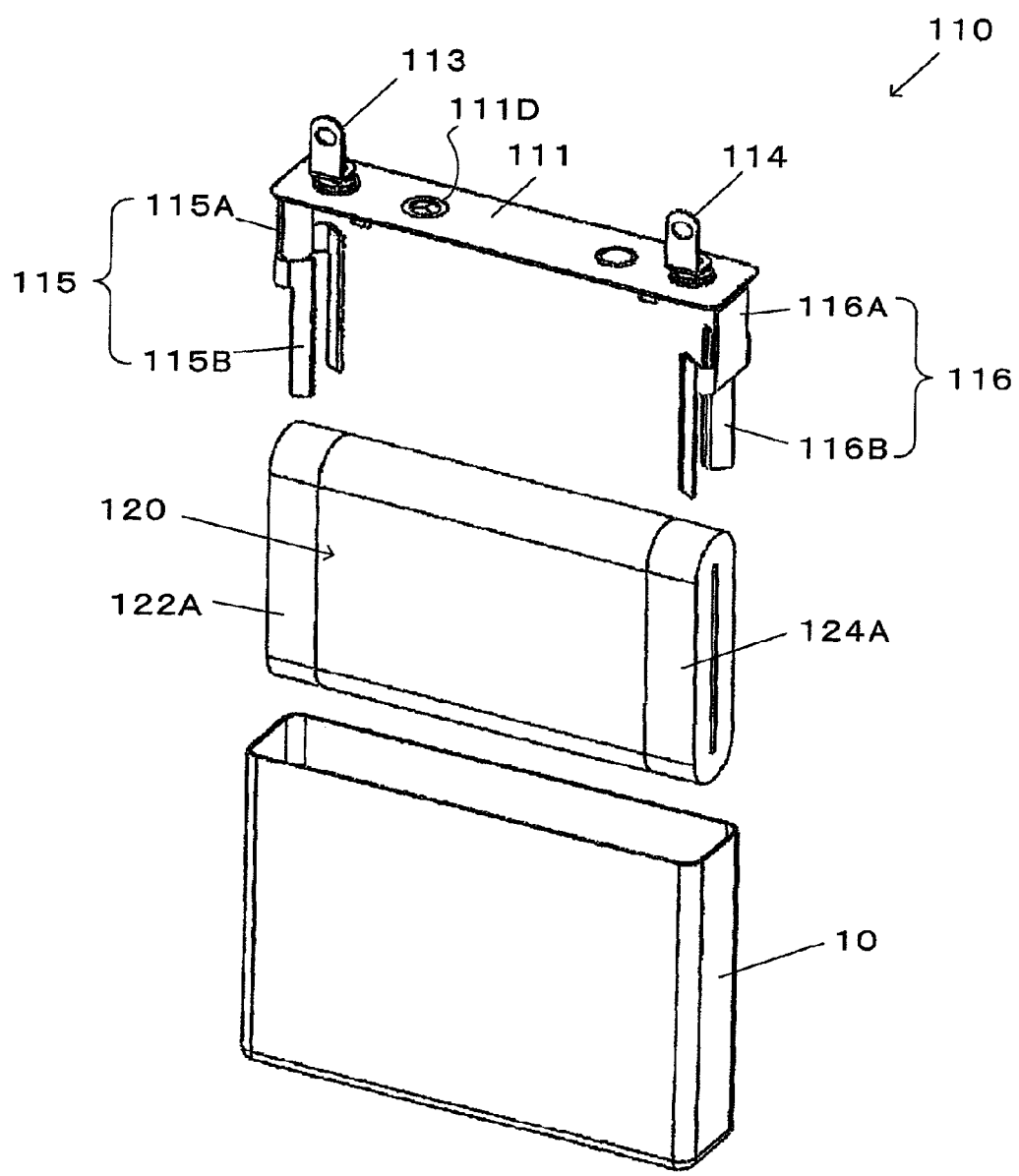
FIG. 3 presents an exploded perspective view of the prismatic cell shown in FIG. 1.
Figure 4A:
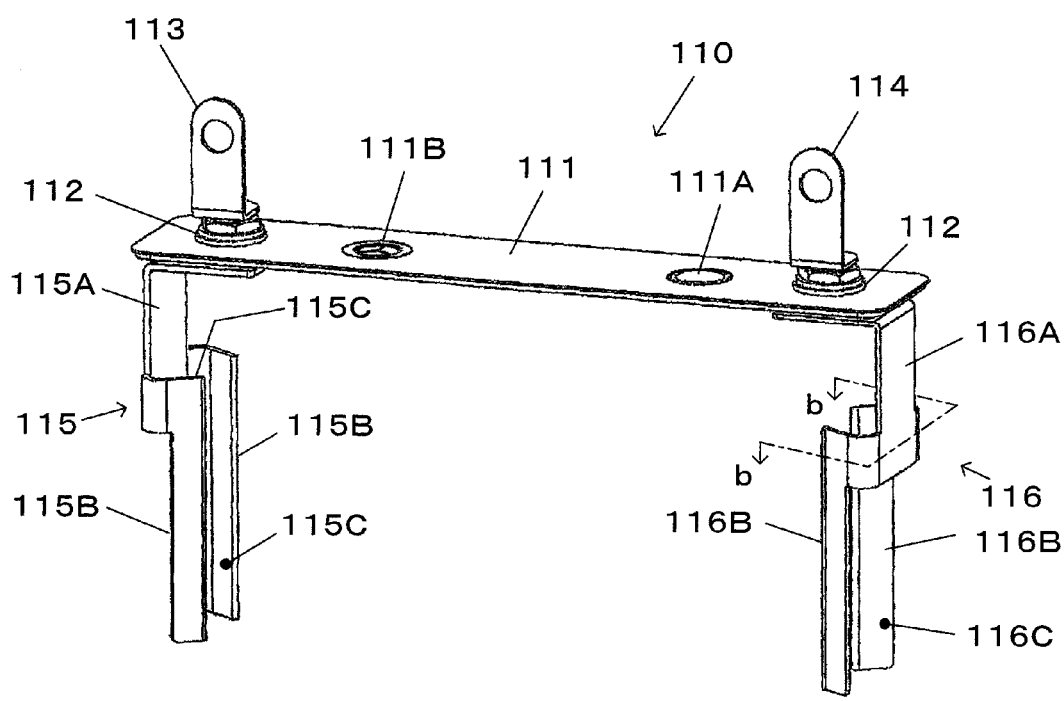
FIG. 4A presents a perspective view of a lid assembly of the prismatic cell shown in FIG. 1.
Figure 4B:
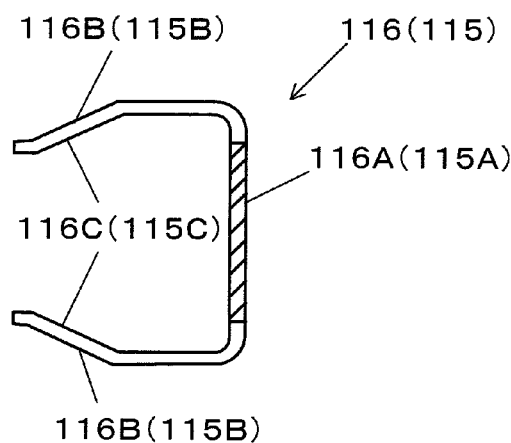
FIG. 4B presents a cross-sectional view of a collector member along the line b-b in FIG. 4A.
Figure 5:
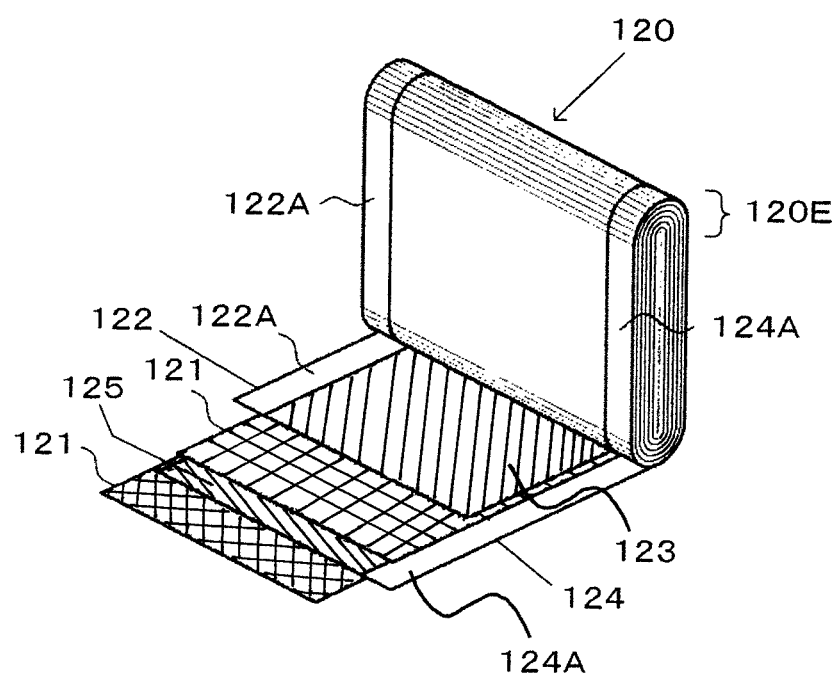
FIG. 5 presents a perspective view of a wound electrode body in the prismatic cell shown in FIG. 1.

Power Generator Element Assembly:

The power generator element assembly 11 shown in FIG. 2 includes a lid assembly 110 shown in FIGS. 3 and 4 and a wound electrode body 120 as shown in FIGS. 3 and 5.

Lid Assembly:

The lid assembly 110 includes a lid 111 that plugs up the opening of the container 10, positive and negative external terminals 113 and 114 that extends through the lid 111 via an insulator sealing member 112, and positive and negative electrode collector members 115 and 116 connected to the positive and negative external terminals 113 and 114, respectively, as shown in FIGS. 2 to 4, especially FIG. 4.

The positive and negative external terminals 113 and 114 and the positive and negative electrode collector members 115 and 116 are electrically insulated from the lid 111 with the insulator sealing member 112. The collector member base (simply referred to as "base") 115A has a horizontal flat plate that is in contact with a back surface of the lid 111 via an insulator material and a vertical flat plate that is bent from the horizontal flat plate toward the bottom of the container. The vertical flat plate extends in the direction of the bottom of the second battery cell along the narrower side of the container 10. The forked connector leaves 115B constitute a pair of positive electrode connector leaves that extend in the direction of the bottom of the container diverging from both sides of the lower end of the vertical flat plate of the base 115A. A pair of the connector leaves 115B inclines such that when seen from the upper side of the container 10 as shown in FIG. 4B, that is, in cross-sectional shape, the more the spacing between the connector leaves narrows, the closer the position at the leaf is to the point. A pair of inner surfaces 115C of a pair of the connector leaves 115B is connected to an outer surface of the positive electrode current-collecting foil layered portion (i.e., first non-applied part) 122A of the wound electrode body 120 (see FIG. 6A) as described later.

Similarly, the negative electrode collector member 116 includes a collector member base 116A and a pair of negative electrode collector connection leaves (or forked connector leaves) 116B. The collector member base (simply referred to as "base") 116A has a horizontal flat plate that is in contact with a back surface of the lid 111 via an insulator material and a vertical flat plate that is bent from the horizontal flat plate toward the bottom of the container. The vertical flat plate of the negative electrode collector member 116 extends in the direction of the bottom of the second battery cell along the narrower sides of the container 10. The forked connector leaves 116B constitute a pair of negative electrode connection leaves that extend in the direction of the bottom of the container diverging from both sides of the lower end of the vertical flat plate of the base 116A. A pair of connection leaves 116B inclines such that when seen from the upper side of the container 10 as shown in FIG. 4B, that is, in cross-sectional shape, the more the spacing between the connector leaves narrows, the closer the position at the leaf is to the point. A pair of inner surfaces 116C of a pair of the connector leaves 116B is connected to an outer surface of the negative electrode current-collecting foil layered portion (i.e., second non-applied part) 124A of the wound electrode body 120 (see FIGS. 6A and 6B) as described later.

The pair of positive electrode connector leaves 115B sandwiches a laminate 122C of the positive electrode connection part 122A on one end of the wound electrode body 120 as described later. The pair of negative electrode connector leaves 116B sandwiches the wound electrode body 120 such that they sandwich the laminate 124C of the negative electrode connector part 124A on the other end of the wound electrode body 120.

The positive electrode collector member 115 electrically connects the positive electrode connector part 122A of the positive electrode sheet 122 to the positive external terminal 113. The pair of forked connector leaves 115B has connection surfaces 115C which are in contact with front and back surfaces, respectively, of the positive electrode connection part 122A. The negative electrode collector member 116 electrically connects the negative electrode connection part 124A to the negative external terminal 114. The pair of forked connector leaves 116B has connection surfaces 116C which are in contact with front and back surfaces, respectively, of the positive electrode connection part 122A.

On both ends of the wound electrode body 120, the positive electrode sheet laminate 122C of the positive electrode connection part 122A and the negative electrode sheet laminate 124C are present as two separated laminates with respect to each other such that they are expanded outwardly. The separated laminates have respective outer peripheral surfaces that incline such a gap therebetween is widened toward outside of the container (see FIG. 6B). The connection surfaces 115C and 116C of the forked connector leaves 115B and 116B of the positive and negative electrode collector members 115 and 116, respectively, are welded by the respective outer peripheral surfaces.

Although the negative electrode collector members 116 have been explained above referring to FIGS. 6A and 6B, the positive electrode collector members 115 have substantially the same structure as those of the negative electrode collector members 116, though in a inverted relationship, illustration and detailed explanation of relationship between the positive electrode collector members 115 and the laminate 122C of the positive electrode collection part 122A is omitted.

Wound Electrode Body:

As shown in FIG. 5, the wound electrode body 120 includes a set or laminate of a positive electrode sheet 122 and a negative electrode sheet 124 as well as a separator 121 disposed between the electrode sheets 122 and 124, which laminate is wound about an axle (not shown) to be flat in cross-section. The positive electrode sheet 122 includes an aluminum foil or an aluminum alloy foil on which a positive active material has been applied and the negative electrode sheet 124 includes a copper foil or a copper alloy foil on which a negative active material has been applied. The separator 121 is comprised by porous polyethylene resin.

The axle that can be used includes a roll of the separator formed by winding (winding) the separator alone a plurality of times or a flat plate made of a resin.

A positive active material (positive electrode) 123 is applied on both sides of the positive electrode foil and thereof with a negative active material (negative electrode) 125 is applied on both sides of the negative electrode foil. On one end of the wound electrode body 120, there is provided a positive electrode connection part (also referred to as "current-collecting foil layered portion") 122A, where the positive electrode foil is exposed without being applied with the positive active material. On the other end of the wound electrode body 120, i.e., on the negative electrode side end, there is provided a negative electrode connection part (also referred to as "current-collecting foil layered portion") 124A, where the negative electrode foil is exposed. The positive and negative electrode foils are connected at their respective connection parts 122A and 124A to the positive and negative electrode collector members 115 and 116, respectively, as described later.

A production method for producing the above-mentioned prismatic cell is explained below.

Assembly of Prismatic Cell:

The lid assembly 110 and the wound electrode body 120 are integrated to fabricate a power generator element assembly 11 and the power generator element assembly 11 is inserted into the container 10. The lid 111 is welded to the container 10 by laser welding to seal the container 10. The lid 111 is provided with a liquid injection hole 111A and a gas discharge hole 111B. After the lid 111 is welded to the container 10, an electrolyte (not shown) is injected into the container 10 through the liquid injection hole 111A. After the electrolyte is injected, a plug 111C is welded to the liquid injection hole 111A by laser welding to seal the liquid injection hole 111A. A gasket 112 made of an insulator resin is attached to the positive and negative external terminals 113 and 114 to electrically insulate from the lid 111 and at the same time seal the gap between the positive and negative external terminals 113 and 114 and the lid 111. The gas discharge hole 111B is provided with a disk 111D having formed therein a cleavage groove which is cleaved when pressure of a gas in the container is increased and through which the gas can be discharged. In addition, a sealing plug 111E may be detachably attached on the disk 111D.

Assembly of power generator element assembly:

A procedure of assembling the power generator element assembly 11 is explained below.

First of all, a wound electrode body 120 as shown in FIG. 5 is fabricated. That is, the positive electrode sheet 122 and the negative electrode sheet 124 together with the separator 121 intervening therebetween for insulation are laminated and wound around an axle formed by winding the separator 121 at least one round. A part of the separator 121 of the wound electrode body 120 that is present on an outermost surface of the wound electrode body 120 is fixed thereto with a tape (not shown).

Figure 6A:
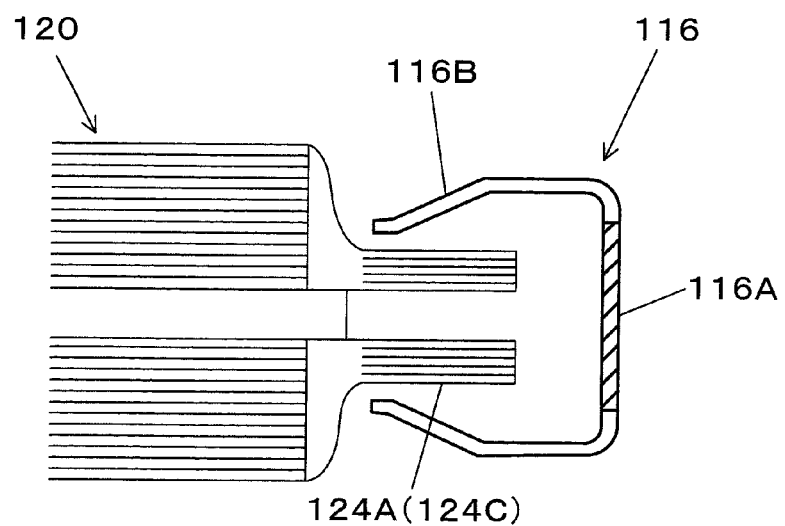
FIG. 6A presents an enlarged cross-sectional view of a negative electrode-side end illustrating a process of integrating the wound electrode body with the collector member.

The current-collecting foil layered portions 122A and 124A are pressed or crushed in the direction of thickness to deform them before the wound electrode body 120 and the current collector members 115 and 116 can be integrated. One end of the wound electrode body 120 is inserted between the pair of connector leaves 115E of the positive electrode collector members 115 and the other end thereof is inserted between the pair of the negative electrode collector connection leaves 116B of the negative electrode collector members as follows. That is, the inner surfaces 115C of the pair of forked connector leaves 115B of the positive electrode collector members 115 are brought into contact with the outer surfaces of the positive electrode connection part 122A of the wound electrode body 120. On the other hand, the inner surfaces 116C of the pair of forked connector leaves 116B of the negative electrode collector members 116 are brought into contact with the outer surfaces of the negative electrode connection part 124A of the wound electrode body 120. This state is shown in FIG. 6A. FIG. 6A presents a cross-sectional view of the negative electrode side end of the prismatic cell.

Though not shown, the positive electrode side end of the prismatic cell has substantially the same structure as the negative electrode side end.

For instance, the positive electrode collector member 115 is made of aluminum. The positive electrode foil is comprised by an aluminum foil, and it is piled up plurality of times in the wound electrode body 120. The negative electrode collector member 116 is made of copper. The negative electrode foil is comprised by a copper foil, and it is piled up in a plurality of times in the wound electrode body 120.

Figure 6B:
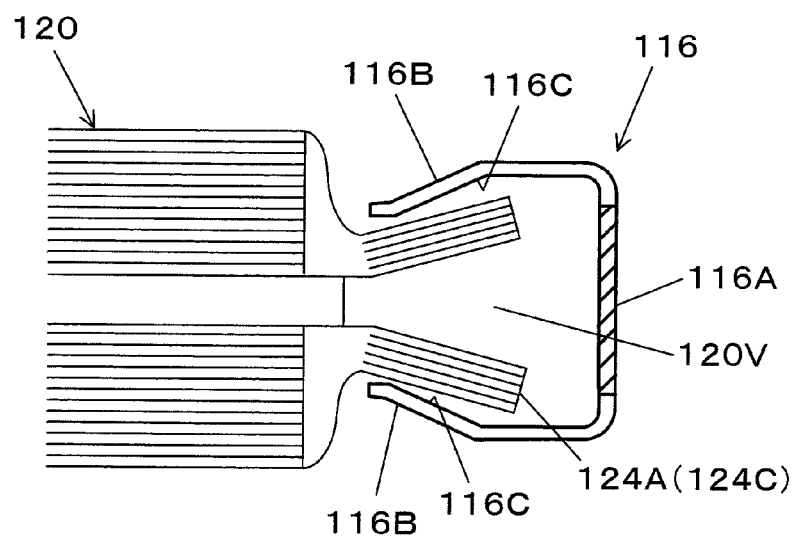
FIG. 6B presents an enlarged cross-sectional view of a negative electrode-side end illustrating the process of integrating the wound electrode body with the collector member.
Figure 7:
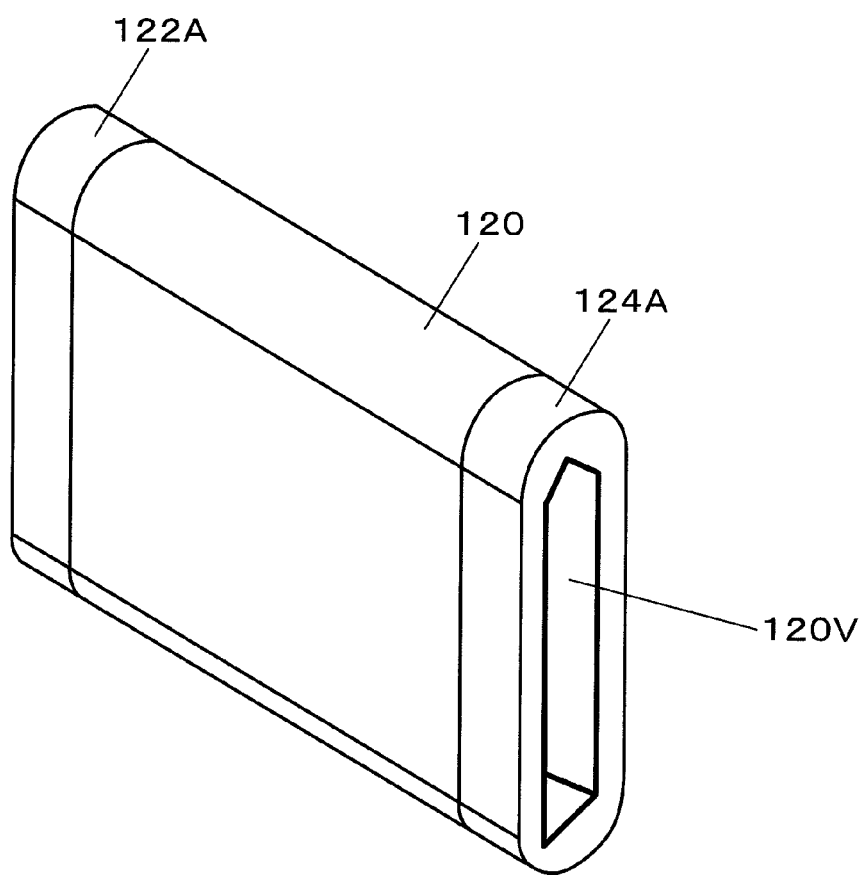
FIG. 7 presents a perspective view of the wound electrode body showing a state in which the current-collecting foil layered portion of the prismatic cell shown in FIG. 1 is expanded from an inner periphery thereof.

After the wound electrode body 120 is inserted between the collector members 115 and 116, the laminate 124C of the negative connection part 124A is pressed away outwardly to separate it into two laminates at the end surface of the wound electrode body 120 as shown in FIG. 6B. As shown also in FIG. 7, the laminate 124C on one end of the wound electrode body 120 is spread into a form of V-letter to form a space 20V available for welding. Similarly, a space available for welding is formed on the end surface of the positive electrode connection part 122A.

Figure 8A:
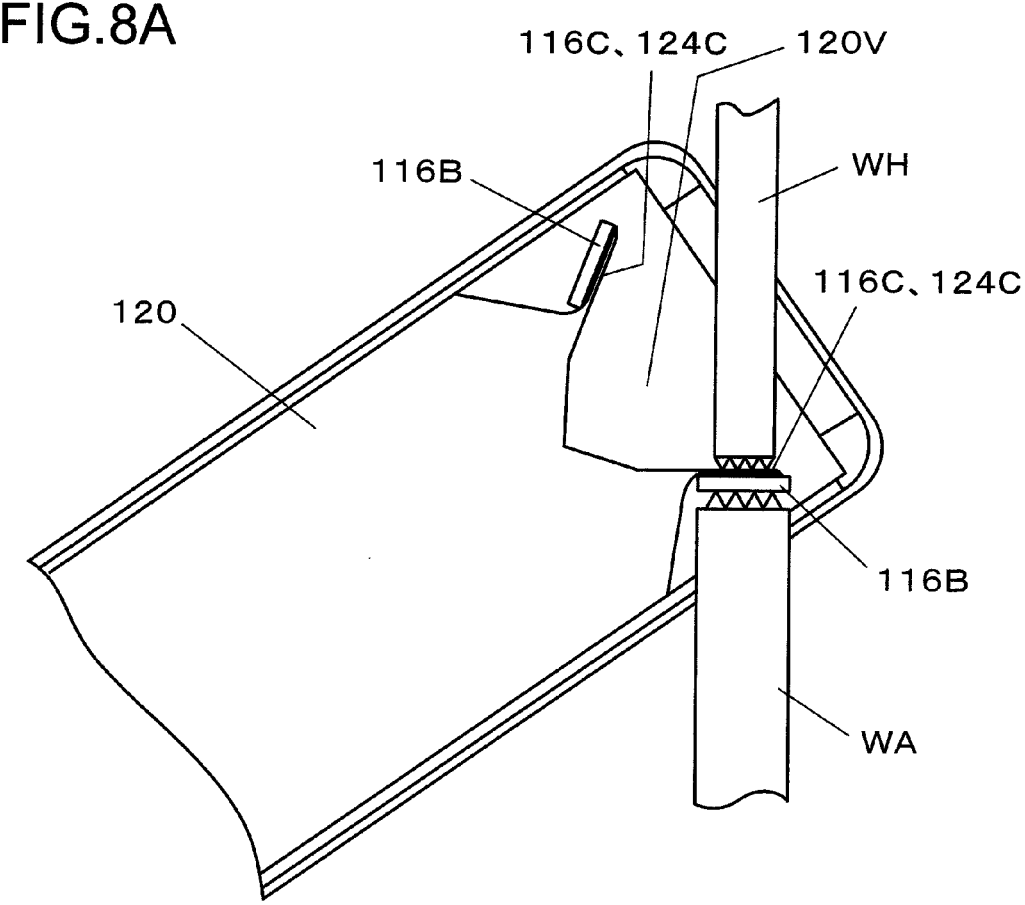
FIG. 8A presents an enlarged cross-sectional view of the negative electrode-side end illustrating a process for ultrasonically welding the wound electrode body to the collector member.
Figure 8B:
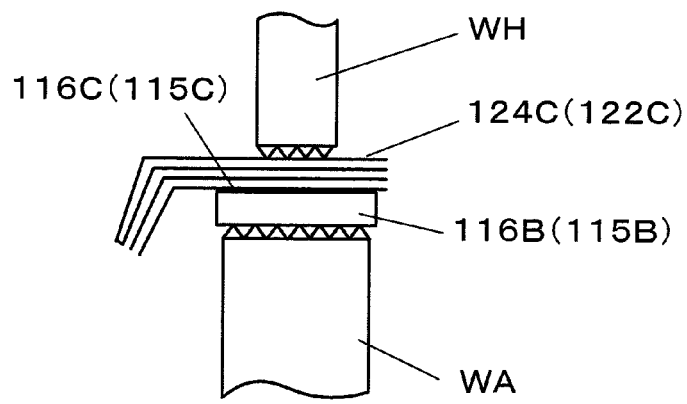
FIG. 8B presents a partial enlarged cross-sectional view of the negative electrode-side end shown in FIG. 8A.

FIGS. 6A and 6B are schematic representation and do not correspond to FIGS. 8A and 8B exactly.

After the current-collector foil layered portions 122A and 124A on both ends of the wound electrode body 120 are each pressed to spread outwardly, the separated laminates are welded to the connector leaves 115B and 116B, respectively, as shown in FIGS. 8A and 8B. That is, the separated laminates 124C of the negative electrode connection part (current-collecting foil layered portion) 124A and the forked negative electrode connector leaves 116B are sandwiched by an ultrasonic chip WH and an anvil WA for use in ultrasonic welding and welded by ultrasonic welding (see FIG. 8A). Though not shown, the laminate 122C of the positive electrode connection part 122A and the forked positive electrode connector leaves 115B are similarly sandwiched by the ultrasonic chip WH and the anvil WA and welded by ultrasonic welding.

That is, as shown in FIG. 8B, the ultrasonic chip WH and the anvil WA are arranged so as to be opposite to each other along a normal to the connection surface 115C and 116C of the forked connector leaves 115B and 116B. Either one of the anvil WA and the ultrasonic chip WH, for example, the ultrasonic chip WH in the present embodiment is disposed so as to abut the inner peripheral surface of the laminate 122C and 124C, and the other, i.e., the anvil WA in the present embodiment is disposed so as to abut the outer surface of the forked connector leaves 115B and 116B. When welding energy is applied to the ultrasonic chip WH while pressurizing the chip WH, the laminates 122C and 124C are welded to the connection surfaces 115C and 116C, respectively, by ultrasonic welding. As a result, the positive and negative electrode current-collecting foil layered portions 122A and 124A of the wound electrode body 120 are electrically connected to the positive and negative collector members 115 and 116, respectively.

The current-collecting foil layered portions 122A and 124A are welded to the connector leaves 115B and 116B at, for example, two positions in the circumferential direction, so that an energizing route from the positive electrode foil and the negative electrode foil to the current collector members 115 and 116, respectively, can be shortened and at the same time connection resistance can be decreased to increase power output of the cell.

Figure 9:
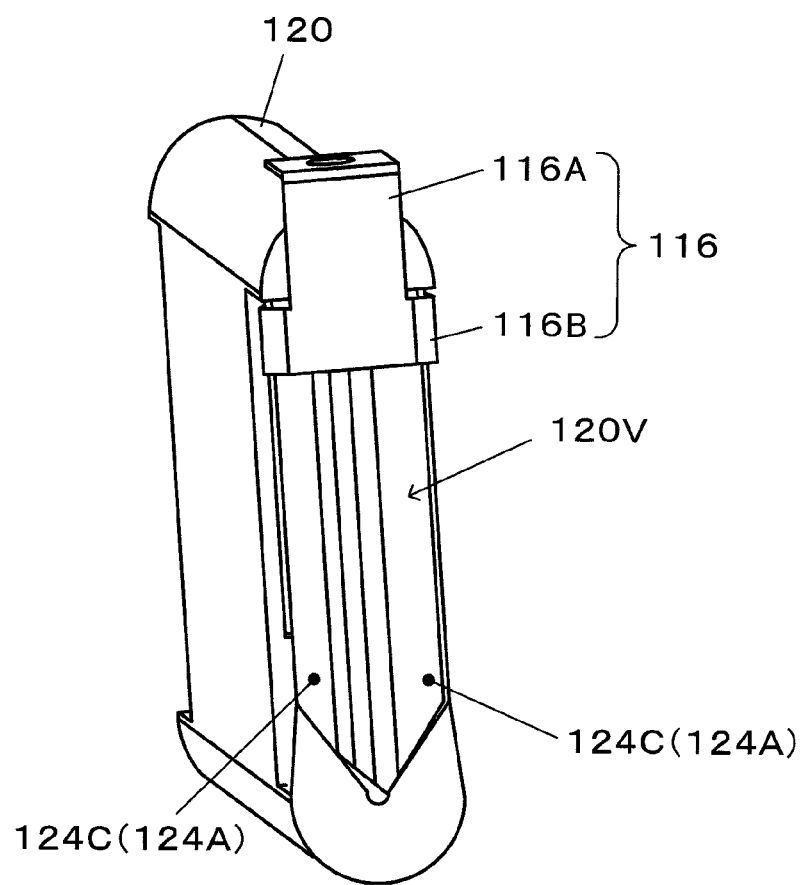
FIG. 9 presents a perspective view of the prismatic cell in which the wound electrode body is welded to the collector member as seen from the negative electrode side.

According to the above-mentioned assembling procedure, the separated laminates 124C of the negative electrode connection part 124A exposed on the front and back surfaces on one end of the wound electrode body 120 are integrated and connected to the connector leaves 116B of the negative electrode collector members 116, respectively, as shown in FIG. 9. Though not shown, the laminates 122C of the positive electrode connection part 122A exposed on the front and back surfaces on the other end of the wound electrode body 120 are integrated and connected to the connector leaves 115B of the positive electrode collector members 115, respectively.

The above-mentioned production method for producing a prismatic cell includes a step of fabricating a lid assembly 110 by connecting the positive and negative external terminals 113 and 114 of the lid 111 to the positive and negative electrode collector members 115 and 116, respectively; a step of fabricating a wound electrode body 120 by winding the positive electrode sheet 122 and the negative electrode sheet 124 as well as the separator 121 intervening therebetween into a flat shape in cross-section; a step of integrating the lid assembly 110 with the wound electrode body 120; a step of separating two laminates by outwardly pressing the laminates 122C and 124C of the positive and negative electrode connection parts 122A and 124A, where the positive and negative electrode sheets 122 and 124 have each no active material applied thereon, on both ends of the wound electrode body 120 in the direction of winding axis; and a step of connecting the two separated laminates to the forked connector leaves 115B and 116B of the positive and negative electrode collector members 115 and 116, respectively.

The step of connecting the two separated laminates includes a substep of arranging the ultrasonic chip WH and the anvil WA along a normal to the connection surfaces 115C and 116C of one of the forked connector leaves 115B and 116B, respectively; a substep of disposing one of the anvil WA or the ultrasonic chip WH so as to abut against the inner peripheral surface of one of the two separated laminates and also disposing the other of the anvil WA or the ultrasonic chip WH so as to abut against the outer peripheral surface of one of the connector leaves 115B and 116B of the forked connector leaves 115B and 116B, respectively, clamping the two separated laminates and the connection surfaces by the ultrasonic chip and the anvil, and applying welding energy to the ultrasonic chip to weld the laminates to the connection surfaces.

The ultrasonic chip WH and the anvil WA may be arranged in any positional relationship therebetween. The ultrasonic chip WH may be disposed so as to abut against the outer surfaces of the forked connector leaves 115B and 116B, respectively, and the anvil WA may be disposed so as to abut against the sheet laminates 122C and 124C.

The prismatic lithium-ion battery according to the above-mentioned embodiment has at least one of the following advantageous effects.

(1) Both the ends of the wound electrode body 120 in the direction of the winding axis are opposite to the narrower side surface of the ends of the container 10 in the direction of the winding axis. The respective forked connector leaves 115B and 116B of the positive and negative electrode collector members 115 and 116 extend toward the bottom of the container 10 along the narrower side surface of the container 10. The end surfaces of the positive and negative electrode connection parts 122A and 124A on both ends of the wound electrode body 120 are each pushed outwardly, i.e., from the inner peripheral surface side toward the outer peripheral surface side and separated into two laminates. The two separated laminates 122C and 124C are arranged as inclined such that the gap therebetween is wider toward the narrower side surfaces. The outer peripheral surfaces of the separated laminates 122c and 124C are welded to the connection surfaces 115C and 116C of the forked connector leaves 115B and 116B of the positive and negative electrode collector members 115 and 116, respectively.

That is, the metal foils of the positive and negative electrode sheets 122 and 124, i.e., laminates 122C and 124C in the current-collecting foil layered portions 122A and 124A of the wound electrode body 120 are welded after they have been distributed or separated into two laminates, so that the number of metal foils can be decreased to a half the number of the metal foils before the distribution or separation. As a result, welding strength can be stabilized and welding energy can be decreased, so that there will occur no stain, which leads to improvement of quality of battery.

This is in contrast to a conventional cell in which current-collecting foil layered portions 122A and 124A are compressed in the lump toward the center of winding to form an integrated laminated portion, which is then welded to the collector members. This type of conventional battery is defective since the number of positive and negative electrodes in the laminated portion is considerably large, so that welding strength is instable to cause stain or otherwise unsatisfactory and there is a possibility to cause insufficient quality.

(2) The pair of connection surfaces 115C and 116C of the forked connector leaves 115B and 116B, respectively, are formed nonparallel to each other. More particularly, the connection surfaces 115C and 116C are inclined such that the gap therebetween is decreasing as they extend from the narrower side surface of the container 10 toward the inside of the container 10 so that they can connect with the outer peripheral surfaces of the laminates 122C and 124C that are separated and inclined with respect to each other. That is, the forked connector leaves 115B and 116B are arranged as being tilted at an angle therebetween such that a normal line to any one of the pair of the connection surfaces 115C and 116C on the respective inner sides of the forked connector leaves 115B and 116B does not pass the other of the connection surface 115C or 116C.

Therefore, the ultrasonic chip WH and the anvil WA can be arranged along the respective normal lines of the connection surfaces 115C and 116C. With this arrangement, none of the connection surfaces 115C and 116C of the forked connector leaves 115B and 116B is positioned in the direction of the normal line to the other of the connection surfaces 115C and 116C (in other words, the normal line to the other of the connection surfaces 115C and 116C passes through neither the connection surface 115C nor the connection surface 116C). Therefore, when the ultrasonic chip WH is positioned in the concave 120V, it will not interfere with the other connection surface 115C or 116C, i.e., the other of the forked connector leaves 115B and 116B.

When the ultrasonic chip WH and the anvil WA thus arranged clamp the laminate 122C or 124C and the forked connector leaf 115B or 116B, respectively, therebetween and welding energy is applied to the ultrasonic chip WH to weld the laminate 122C or 124C to the connection surface 115C or 116C, respectively, the quality of welding can be secured since application of necessary pressure is given by the ultrasonic chip to the object to be welded causes no deformation of the anvil.

In the battery according to Japanese Patent No. 4061938, the anvil is supported by a cantilever mechanism, so that there may occur insufficient supply of pressure for welding from the ultrasonic chip or the anvil tends to be bent if sufficient pressure is supplied thereto, resulting in a failure to secure the quality of welding.

(3) A circular portion 120E, i.e., an upper portion of the wound electrode body 120 is formed so as to be wider than a gap between the forked connector leaves 115B and 116B upon fabricating the wound electrode body 120. The forked connector leaves 115B and 116B are fitted with the circular portion 120E after the circular portion 120E is compressed in the direction of the shorter diameter. This makes the process of fitting the forked connector leaves 115B and 116B easier. The circular portion 120E is not supposed to be welded to the connector leaves 115B and 116B, so that there will occur no problem of a decreased quality due to compression.

(4) A conventional battery has been fabricated by fixing and connecting the collector members to the lid after the collector members were welded to the current-collecting foil layered portions 122A and 124A of the wound electrode body. In this case, the gap between the lid and the wound electrode body is relatively narrow. As a result, fixing becomes difficult. In addition, there is a possibility that the wound electrode body is damaged or contaminated with foreign matter during the fabrication process, resulting in deterioration of the quality of the battery.

According to the present embodiment, it is possible to fit and weld the collector members 115 and 116 to the lid 111 by easy operation. Therefore, there is no possibility that the quality of the battery is deteriorated, but instead productivity can be increased and production cost can be decreased.

In the above explanation, no specific explanation has been made on a method of separating two laminates by pressing the laminates 122C and 124C so as to be spread from the inner peripheral surface to the outer peripheral surface. However, various methods including one disclosed in an international application PCT/JP2010/054047 filed Mar. 10, 2010 designating United States of America, the disclosure of which is incorporated herein by reference, can be used for this purpose as explained below.

Besides the wound electrode body 120, an expander provided with members that can be opened or closed (or movable closer or remoter) is provided. The expander can be inserted into a central part of the wound electrode body 120 from an end of the wound electrode body 120 and operated so as to open to spread the laminates in both directions from the inner periphery toward the outer periphery. In this case, the expander may be removed after they are used to spread the laminates 122C and 124C each from inside toward outside to provide two separated laminates. It does not have to be removed if there will be no trouble. Alternatively, the expander may be provided in advance in the innermost peripheral portion of the wound electrode body 120.

The expander may be, for example, a folded plate, i.e., a V-form structure having a basal portion from which two plate sections or wings extends. The folded plate is arranged such that the folded basal portion of the folded plate is located inward in the wound electrode body 120 and the line around which the plate is folded (folding axis) extends in the direction of longer axis of the end surface of the wound electrode body. As a result, it is possible to separate the two laminates 122C and 124C by opening the two wings, i.e., increasing an angle formed between the wings, of the V-form folded plate to push the laminates 122C and 124C from the inner periphery outwardly to make the laminates open, i.e., render apart from each other to provide two separated laminates.

As mentioned above, the foil laminates 122C and 124C that are susceptible to deformations or damages can be readily expanded or spread without giving damages to the positive and negative electrode sheets 122 and 124 by using the expander.

The above explanation has been made according to one embodiment of the present invention and the present invention can be applied to various prismatic cells that have different structures without departing the scope of the present invention.

Therefore, the present invention is not limited with respect to shapes and structures of respective components of the prismatic cell to those illustrated and described in embodiments disclosed herein. The present invention can be applied to various types of prismatic cells in which on both the ends of the wound electrode body 120 in the direction of winding axis, the laminate 122C of the positive electrode sheet 122 in the positive electrode connection part 122A and the laminate 124C of the negative electrode sheet 124 in the negative electrode connection part 124A are bent or folded in the direction of thickness of the flat container 10 from the inner peripheral side toward the outer peripheral side to be separated into two laminates, and the connection surfaces 115C and 116C of the forked connector leaves 115B and 116B of the positive and negative electrode collector members 115 and 116, respectively, are welded to the respective outer peripheral surfaces of the separated laminates.

What is claimed is:
1. A prismatic cell comprising:
   a wound electrode body that includes
   a positive electrode sheet having a first metal foil on which a positive active material has been applied,
   a negative electrode sheet having a second metal foil on which a negative active material has been applied, and
   a separator intervening between the positive and negative electrode sheets, wherein
   the positive electrode sheet, the negative electrode sheet and the separator are wound around a winding axis into a flat shape, and
   a part of the first metal foil is applied with no positive active material at one end of the wound electrode body in a direction of the winding axis to constitute a first non-applied part of the wound electrode body, and a part of the second metal foil is applied with no negative active material at another end of the wound electrode body in the direction of the winding axis to constitute a second non-applied part of the wound electrode body;

a flat container having a flat shape in cross-section, in which the wound electrode body is accommodated, the container having an opening, first opposite sides and second opposite sides and a bottom, with the first opposite sides being shorter than the second opposite sides;

a lid that seals the opening of the container;

positive and negative external terminals provided on the lid;

a positive electrode collector member that is connected to the first non-applied part of the wound electrode body, wherein the positive electrode collector member includes a horizontal flat plate opposite to a back surface of the lid, a vertical flat plate that is bent from the horizontal flat plate toward the bottom of the container and a pair of positive electrode connector leaves provided at both sides of a lower end of the vertical flat plate, the pair of the positive electrode connector leaves protruding from both sides of a lower end of the vertical flat plate, being inclined such that a gap therebetween is decreasing as the positive electrode connector leaves extend from one of the first opposite sides toward an inside of the container, extending toward the bottom of the container, and being respectively connected to an outer peripheral surface of the first non-applied part of the wound electrode body; and a negative electrode collector member that is connected to the second non-applied part of the wound electrode body, wherein the negative electrode collector member includes a horizontal flat plate opposite to a back surface of the lid, a vertical flat plate that is bent from the horizontal flat plate toward the bottom of the container and a pair of negative electrode connector leaves provided at both sides of a lower end of the vertical flat plate, the pair of the negative electrode connector leaves protruding from both sides of a lower end of the vertical flat plate, being inclined such that a gap therebetween is decreasing as the negative electrode connector leaves extend from one of the first opposite sides toward an inside of the container, extending toward the bottom of the container, and being respectively connected to an outer peripheral surface of the second non-applied part of the wound electrode body;

the positive electrode sheet has the first non-applied part of the wound electrode body, and the first non-applied part has two positive electrode sheet laminates that are present as two separated laminates with respect to each other such that the two separated laminates are expanded outwardly, and the positive electrode sheet laminates have a peripheral surface that is situated in the external boundary of the positive electrode sheet laminate, and the pair of the positive electrode connector leaves are respectively connected to portions of the outer peripheral surfaces that oppose an inner surface of the flat container;

the negative electrode sheet has the second non-applied part of the wound electrode body, and the second non-applied part has two negative electrode sheet laminates that are present as two separated laminates with respect to each other such that the two separated laminates are expanded outwardly, and the negative electrode sheet laminates have a peripheral surface that is situated in the external boundary of the negative electrode sheet laminate, and the pair of the negative electrode connector leaves are respectively connected to portions of the outer peripheral surfaces that oppose the inner surface of the flat container;

the pair of the positive electrode connector leaves protruding from the both sides of the vertical flat plate directly and extending toward inside to the flat container; and the pair of the negative electrode connector leaves protruding from the both sides of the vertical flat plate directly and extending toward inside to the flat container.

2. A prismatic cell according to claim 1,
wherein forked pairs of the positive and negative electrode connector leaves are arranged as being tilted therebetween such that a normal line to any one of the pair of connection surfaces on respective inner sides of the forked pairs of the positive and negative electrode connector leaves, does not pass the other of the connection surface.

3. A prismatic cell according to claim 1, wherein
the first non-applied part of the wound electrode body includes, in cross-section, a plurality of portions of the positive electrode sheet, which are arranged as the two separated laminates of the plurality of portions of the positive electrode sheet, with a gap between the two separated laminates of the portions of the positive electrode sheet in a direction of a thickness of the flat container and broadening toward a first side of the first opposite sides, and the second non-applied part of the wound electrode body includes, in cross-section, a plurality of portions of the negative electrode sheet, which are arranged as the two separated laminates of the plurality of portions of the negative electrode sheet, with a gap between the two separated laminates of the portions of the negative electrode sheet in the direction of the thickness of the flat container and broadening toward a second side of the first opposite sides, and wherein
connection surfaces of the pair of the connector leaves of the positive and negative electrodes collector members, respectively, are welded to the respective outer peripheral surfaces of the separated laminates.

4. A prismatic cell according to claim 1, wherein
the first non-applied part of the wound electrode body is pressed in the direction of thickness and is spread into a form of V-letter to form a space for welding.

5. A prismatic cell according to claim 4, wherein
the first non-applied part of the wound electrode body is connected to the positive electrode connector leaves at two positions in a circumferential direction, and
the second non-applied part of the wound electrode body is connected to the negative electrode connector leaves at two positions in a circumferential direction.

6. A method for producing a prismatic cell according to claim 1, the method comprising:
fabricating a lid assembly by connecting the positive and negative external terminals to the positive and negative electrode collector members, respectively;
fabricating the wound electrode body by winding around the winding axis, the first metal foil, the second metal foil and the separator intervening between the first and second metal foils into a flat shape in cross-section;
integrating the lid assembly with the would electrode body;
separating the two laminates by outwardly pushing the laminates of the first and second non-applied parts, where the first and second metal foils have each no active material applied thereon, on the ends of the wound electrode body in the direction of the winding axis; and welding the two separated laminates to forked pairs of the positive and electrode connective leaves of the positive and negative electrode collector members, respectively.

7. A method according to claim 6, wherein the welding the two separated laminates further comprises:

arranging an ultrasonic chip and an anvil along a normal to connection surfaces of one of the forked connector leaves, respectively;

disposing one of the anvil or the ultrasonic chip so as to abut against an inner peripheral surface of one of the two separated laminates, and also disposing the other of the anvil or the ultrasonic chip so as to abut against the outer peripheral surface of one of the connector leaves of the forked connector leaves, respectively, to clamp the two separated laminates and the connection surfaces by the ultrasonic chip and the anvil; and applying welding energy to the ultrasonic chip to weld the separated laminates to the connection surfaces, respectively.

8. A method according to claim 6, further comprising:

integrating fabricated lid assembly with the wound electrode body.

* * * * *